United States Patent Office

2,721,860
Patented Oct. 25, 1955

2,721,860

RECOVERY OF ACTIN-FREE MYOSIN FROM MUSCLE MATERIAL

Albert E. Szent-Gyorgyi and Andrew G. Szent-Gyorgyi, Woods Hole, Mass., assignors to Armour and Company, Chicago, Ill., a corporation of Illinois No Drawing. Application November 21, 1951, Serial No. 257,642

8 Claims. (Cl. 260—112)

This invention relates to the recovery of actin-free myosin from muscle material.

The solids of muscle tissue are chiefly proteins, which amount to 20% or more of the muscle substance and about 80% of the solids. Myosin is the chief protein generally accounting for approximately 40 to 50% of the total protein. Another important protein has recently been discovered in muscle tissue. This protein is actin. It is believed that actin together with myosin is responsible for the contraction and relaxation of muscles. The system of myosin particles and actin filaments comprising muscle fibers is called actomyosin. It is believed that this intimate association of actin and myosin designated by the term "actomyosin" is itself a chemical compound in which the actin and myosin are chemically bonded. Published determinations of the amount of actin in muscle have varied from 3 to 2.5%. However, it is now believed that there is approximately 1.5 to 1.8% of actin by weight. Polymerized actin, which is the form in which it exists in muscles, is termed F-actin while the depolymerized or globular actin is called G-actin.

Heretofore, actin-free myosin has been prepared from muscle material by a relatively difficult and time-consuming procedure, which was capable of only producing very low yields of the actin-free myosin. It has been known for some time that myosin can be extracted from muscle material by the use of solutions of potassium chloride. However, potassium chloride solutions do not appreciably depolymerize the actin with the result that the yield of the extracted muscle proteins is relatively small. On the other hand, the use of potassium chloride solutions in extracting the myosin had the advantage that the extracted proteins contained a considerably smaller proportion of actin than was present in the raw muscle material. It was then possible to recover actin-free myosin from the extracted material by procedures based on the differential solubilities of myosin and actomyosin. A typical yield of the use of potassium chloride extraction followed by differential solubility separation is around 1 gram of actin-free myosin from 100 grams of raw muscle material. Thus, it is apparent that one serious defect of prior methods of obtaining actin-free myosin is that only very low yields could be obtained. A further disadvantage of prior procedures is that they could be applied only to the separation of actin-free myosin from muscle material having a low actin content. For example, these procedures were unsuitable for the separation of actin-free myosin from actomyosin.

Therefore, it is an object of this invention to provide a new method for separating actin-free myosin from muscle material by means of which the actin-free myosin can be obtained in greatly increased yields. It is a further object of this invention to provide a method for recovering actin-free myosin in which the starting material can be actomyosin or other muscle material of relatively high actin content. It is a still further object of this invention to provide a procedure for recovering actin-free myosin which will substantially shorten the time required to prepare this product by known methods. Further objects and advantages will appear as the specification proceeds.

This invention is based in part on the discovery that when muscle material is treated with aqueous potassium iodide solutions that the actin is depolymerized, and that a large amount of protein is extracted. In fact, the extract obtained by treating muscle material with aqueous potassium iodide will generally contain both actin and myosin in such proportions that it can be said to contain substantially all actomyosin. We have made the further discovery that when the extraction of the muscle material with potassium iodide solution is carried out in the presence of adenosine triphosphate (hereinafter generally referred to as ATP), the actin is reversibly depolymerized. This makes possible the separation of fairly pure actin from the muscle material by precipitating the myosin with a precipitating agent such as ethyl alcohol. This procedure is set out in detail in our copending application U. S. Serial No. 257,641, filed November 21, 1951.

We have now made the additional discovery that if muscle material is extracted with aqueous potassium iodide in the absence of ATP, that the actin is irreversibly depolymerized. This discovery makes possible the separation of actin-free myosin by the method which will be subsequently described in detail.

Raw muscle material contains substantial quantities of ATP, and, in fact, it is comparatively difficult to completely remove the ATP from the muscle material. In general, the fresher the muscle material the more ATP it contains, while older muscle material contains a somewhat reduced amount of ATP. Therefore, if raw muscle material is treated with a potassium iodide solution there will almost certainly be enough ATP supplied to the solution from the muscle material to reversibly depolymerize a considerable portion of the actin. If a satisfactory separation of the actin and myosin to produce actin-free myosin is to be achieved, it is essential that the amount of ATP present during the extraction step be reduced to a very low level. When using raw tissue as a starting material, it is necessary to wash the muscle tissue until it is substantially free of ATP. Pure water can be satisfactorily used for this purpose. However, it is preferred to use a dilute aqueous solution of potassium chloride or potassium chloride and potassium phosphate. Generally several washings will be required to reduce the amount of ATP in the tissue to a sufficiently low value. While some variation is permissible, in general it can be stated that the ATP in the muscle tissue should be reduced to a point where if all of the remaining ATP in the tissue passed into the potassium iodide solution that the concentration of ATP in the solution would not be over $10^{-5}$ molar. Preferably, the concentration of ATP in the solution should be kept below $5 \times 10^{-6}$ molar throughout the extracting period.

After the ATP has been substantially removed from the raw muscle tissue by repeated washings, the tissue is then treated with an aqueous solution of potassium iodide substantially free of ATP to extract the myosin and actin therefrom while irreversibly depolymerizing the actin. For satisfactory results, it is necessary to employ at least an 0.4 molar concentration of potassium iodide, and preferably between about 0.5 to a 0.8 molar concentration of potassium iodide. Higher concentrations than 0.8 molar can be used with some success, but there does not appear to be any particular advantage in using higher concentrations. It is only necessary to use a sufficient amount of potassium iodide in the solution to bring about the depolymerization of the actin.

For best results the extraction of the muscle material should be carried out with a cold potassium iodide solution. The maximum temperature at which the extraction can be effectively carried out is about 10° C., and preferably the temperature of the extracting solution should be maintained between about 0 to 5° C.

Following the extraction step, the residue is separated from the supernatant which contains the myosin and depolymerized actin. This can be done by any suitable means, such as for example centrifugation or filtration. The myosin is then precipitated from the supernatant to obtain the actin-free myosin. This can most conveniently be done by decreasing the concentration of the potassium iodide by adding water to the supernatant. Myosin is substantially insoluble in water and in low concentrations of aqueous potassium iodide. The required degree of dilution varies somewhat, but in general it is necessary to reduce the potassium iodide concentration to below about 0.05 molar, and preferably to below about 0.03 molar. Excellent results are obtained when the potassium iodide concentration is reduced to around 0.025 molar. However, the amount of water required can easily be determined by adding the water incrementally until the desired precipitate is obtained. As in the preceding steps, it is preferred to maintain the supernatant at between about 0 to 5° C. during the precipitation of the myosin.

If the myosin and actin had been extracted from the muscle material in the presence of ATP, the dilution of the supernatant would cause the actin to polymerize with the result that a precipitate of actomyosin would be formed. However, as indicated above, by carrying out the extraction in the absence of ATP the actin is irreversibly depolymerized, and therefore the dilution of the supernatant precipitates only the myosin, rather than both the myosin and actin.

The precipitated myosin can be separated from the supernatant by any suitable means, such as for example centrifugation or filtration. The separated product is substantially actin-free as determined from the superprecipitation and viscosity measurements. With this procedure, it has been determined that from 3.5 to 4 grams of the actin-free myosin can be obtained from 100 grams of raw muscle tissue. Therefore, the yield of actin-free myosin by this process is from 3 to 4 times higher than the yield of myosin obtained by previous methods.

The above process makes possible the separation of actin-free myosin from a wide variety of muscle material. The starting materials which can be used in this process can be referred to generically as muscle material containing myosin in intimate association with polymerized actin. Not only raw muscle tissue but also products derived therefrom such as actomyosin fall within this class, and are suitable for use in the process of this invention.

Actomyosin can be obtained from raw muscle tissue by a variety of methods. One method for obtaining actomyosin is described in our co-pending application U. S. Serial No. 257,641. As previously mentioned, this method involved the step of extracting the raw muscle tissue with an aqueous potassium iodide solution in the presence of ATP. The actomyosin in the supernatant can then be precipitated by diluting the solution to decrease the concentration of potassium iodide therein. This precipitation has been found very effective in purifying the actomyosin, and therefore it may be sometimes desirable to first produce the actomyosin, and then to obtain the actin-free myosin therefrom. However, it will be necessary to completely remove the ATP from the solid actomyosin before extracting it with the potassium iodide. This can be done by either washing the solid actomyosin or carrying the actomyosin through a series of precipitations and resolutions. At any rate, the amount of ATP should be reduced to approximately the same level as when the raw muscle material is extracted, as described above.

After the actomyosin has been freed of ATP, it can then be handled in exactly the same way as the raw muscle tissue. The required procedural steps have already been discussed in detail.

We can also employ as a starting material so-called "Myosin B," which is essentially actomyosin separated from muscle by the method of Banga and Szent-Gyorgyi as reported in Studies Inst. Med. Chem. Univ. Szeged, 1, 5 (1942). The Myosin B can be treated as the actomyosin described above.

Instead of potassium iodide, we can employ other alkali metal iodides, such as sodium iodide, with more or less success. We can also employ alkali metal thiocyanates, such as sodium or potassium thiocyanate to bring about an irreversible depolymerization of actin in the absence of ATP. However, we prefer to employ the alkali metal iodides and particularly potassium iodide, since the alkali metal thiocyanates have some tendency to denature the protein, and therefore to diminish the desired yield. In order to better illustrate the method of this invention, it is desired to set out the following illustrative examples:

Example I 100 g. of fresh rabbit muscle was washed twice with 10 volumes of distilled water of about 5° C. for 10 minutes. The muscle residue was homogenized in a Waring Blendor for 1–2 minutes in 10 volumes of cold distilled water, then KCl was added to bring its concentration to 0.05 M. The muscle was separated in a centrifuge and washed twice with 10 volumes of cold 0.05 M KCl for 10 minutes, the extensive washing being necessary to remove the ATP completely. To the muscle residue obtained, 2 volumes of distilled water and 6.0 M KI, containing 0.06 M sodium-thiosulfate was added to bring the KI concentration to 0.6 M. The suspension was mixed for 10 minutes keeping the temperature below 5° C., then an equal volume of distilled water was added and the residue was eliminated by centrifugation. The myosin was precipitated from the supernatant by adding cold distilled water slowly under constant stirring to bring the KI concentration to 0.025 M. The distilled water was neutralized with dilute NaHCO$_3$ or pH 7.0 phosphate buffer.

In repeated runs starting with 100 g. of muscle, 3.5–4 g. myosin was obtained, thus the yield averaged 3 to 4 times higher than the yield of myosin obtained by conventional methods. The myosin was completely free of actin as was ascertained from superprecipitation and viscosity measurements.

Example II

Actomyosin prepared by the method described in our co-pending application U. S. Serial No. 257,641, was rendered substantially free of ATP by three precipitations and resolutions, or alternately it was washed three times with water or a dilute aqueous solution of potassium chloride. The ATP-free actomyosin was then dissolved in 0.6 M KI during a 10 minute extraction period with the temperature being kept below 5° C. The myosin was then precipitated from the supernatant by diluting the KI to 0.025 M. The precipitated myosin was then separated from the solution by centrifugation.

In repeated runs, the yield of actin-free myosin from actomyosin averaged 50% or more of the myosin originally present in the atomyosin preparation.

Example III

The procedure of Example I can be substantially followed except that an equivalent amount of sodium iodide solution is substituted for the potassium iodide solution to obtain the actin-free myosin.

Example IV

Following the procedure of Example I, actin-free myosin can be obtained by contacting the washed muscle residue with an aqueous solution containing 0.6 M potassium chloride and 0.1 M potassium thiocyanate in place of the potassium iodide solution.

While in the foregoing specification we have set forth specific details of our process and of certain modifications thereof, it will be apparent to those skilled in the art that many of these details can be varied widely without departing from the spirit of our invention.

We claim:

1. In a method of separating actin-free myosin from raw muscle tissue containing myosin in intimate association with actin, the steps of washing said muscle tissue with a dilute aqueous solution of potassium chloride until substantially all of the adenosine triphosphate is removed therefrom, and then extracting said muscle material with an aqueous potassium iodide solution containing not over a $10^{-5}$ molar concentration of adenosine triphosphate to extract the myosin and actin therefrom while irreversibly depolymerizing the actin.

2. In a method of separating actin-free myosin from raw muscle tissue containing myosin in intimate association with actin, the steps of washing said muscle tissue with a dilute aqueous solution of potassium chloride until substantially all of the adenosine triphosphate is removed therefrom, and then extracting the washed muscle tissue with an aqueous solution of an alkali metal salt selected from the group consisting of sodium and potassium iodides and thiocyanates, said alkali metal salt being present in said extracting solution in a sufficient concentration to depolymerize the actin in said muscle tissue, any adenosine triphosphate remaining in said muscle tissue and any adenosine triphosphate in said extracting solution being such that said extraction takes place in the presence of not over a $10^{-5}$ molar concentration of adenosine triphosphate, thereby extracting the myosin and actin from said muscle tissue while irreversibly depolymerizing the actin.

3. The method of obtaining actin-free myosin from muscle tissue, comprising extracting the muscle tissue with an aqueous solution of an alkali metal salt selected from the group consisting of sodium and potassium iodides and thiocyanates, said alkali metal salt being present in said extracting solution in a concentration sufficient to depolymerize the actin, said muscle tissue and said extracting solution both being substantially free of adenosine triphosphate so that said extraction takes place in the presence of less than a $10^{-5}$ molar concentration of adenosine triphosphate, thereby obtaining an extract of myosin and irreversibly depolymerized actin, and then precipitating the myosin from said extract by adding water thereto to decrease the concentration therein of said alkali metal salt, thereby obtaining a substantially actin-free precipitate of myosin.

4. The method of claim 3 in which said alkali metal salt is potassium iodide and it is present in said extraction solution in a molar concentration of from .4 to .8.

5. The method of preparing actin-free myosin from actomyosin, comprising dissolving the actomyosin in an aqueous solution of an alkali metal salt selected from the group consisting of sodium and potassium iodides and thiocyanates, said alkali metal salt being present in said solution in a sufficient concentration to depolymerize the actin in said actomyosin, the adenosine triphosphate in said actomyosin and in said solution being such that the actin is dissolved and depolymerized in the presence of less than a $10^{-5}$ molar construction of adenosine triphosphate, thereby obtaining a solution of myosin and irreversibly depolymerized actin, precipitating myosin from the last-mentioned solution, and separating the precipitated myosin from the supernatant solution of irreversibly depolymerized actin.

6. The method of claim 5 in which said alkali metal salt is potassium iodide and in which the potassium iodide is present in said extraction solution in a molar concentration of from .4 to .8.

7. The method of preparing actin-free myosin from actomyosin, comprising dissolving actomyosin in an aqueous solution of potassium iodide containing from .4 to .8 molar concentration of said potassium iodide, said actomyosin and said extraction solution being substantially free of adenosine triphosphate so that said dissolving takes place in the presence of less than a $10^{-5}$ molar concentration of adenosine triphosphate, thereby obtaining a solution of myosin and irreversibly depolymerized actin, precipitating myosin from the last-mentioned solution, and then separating the precipitated myosin from the remaining supernatant solution of irreversibly depolymerized actin.

8. In a method preparing actin-free myosin from actomyosin, the step comprising dissolving the actomyosin in an aqueous solution of an alkali metal salt selected from the group consisting of sodium and potassium iodides and thiocyanates, said alkali metal salt being present in said solution in sufficient concentration to depolymerize the actin in said actomyosin, said actomyosin and said solution being substantially free of adenosine triphosphate so that said dissolving takes place in the presence of less than a $10^{-5}$ molar concentration of adenosine triphosphate, thereby obtaining a solution of myosin and irreversibly depolymerized actin.

References Cited in the file of this patent

Dainty et al., J. Gen. Physiol., vol. 27, 1944, pp. 355–99.
Jakus, J. Bio. Chem., vol. 167, pp. 705–11 (1947).
Szent-Gyorgyi, J. Coll. Sci., vol. 1, pp. 1–11 (1946).
Edsall, J. Biol. Chem., vol. 89, p. 289 (1930).
Ranzi, Nature, vol. 160, No. 4073, p. 712, Nov. 22, 1947.